(12) United States Patent
Dahl et al.

(10) Patent No.: US 6,298,690 B1
(45) Date of Patent: Oct. 9, 2001

(54) BROKEN GLASS CLEANING METHOD AND PLANT

(76) Inventors: Joel Millard Dahl, 220 F St., West Fargo, ND (US) 58078; Millard Justin Dahl, 5752 County Rd., Leonard, ND (US) 58052

( * ) Notice: Subject to any disclaimer, the term of this patent is extended or adjusted under 35 U.S.C. 154(b) by 0 days.

(21) Appl. No.: 09/578,141

(22) Filed: May 24, 2000

Related U.S. Application Data

(63) Continuation-in-part of application No. 08/953,119, filed on Oct. 17, 1997, now abandoned.

(51) Int. Cl.[7] .................................................. C03B 32/00
(52) U.S. Cl. ................................ 65/28; 134/65; 134/132; 134/19; 134/105; 110/246; 110/236; 110/258; 239/566
(58) Field of Search .................................. 65/28; 134/65, 134/132, 19, 105; 110/246, 236, 258; 239/566

(56) References Cited

U.S. PATENT DOCUMENTS

| | | | |
|---|---|---|---|
| 1,398,470 | * 11/1921 | Sharpe . | |
| 3,705,711 | * 12/1972 | Seelandt et al. . | |
| 3,912,534 | * 10/1975 | Gurta . | |
| 4,769,057 | * 9/1988 | Smolenski et al. . | |
| 5,607,232 | * 3/1997 | Dahl . | |

* cited by examiner

Primary Examiner—Michael Colaianni
(74) Attorney, Agent, or Firm—Curtis V. Harr

(57) ABSTRACT

A large tumbling device into which broken pieces of labeled glass such as beverage bottles, or cullet, are fed. After entering the interior chamber of the tumbler, the cullet is carried by a plurality of interior fins along the inside circumference of the tumbler to a point where the glass falls back to the low point of the tumbler. During this fall, the cullet passes through a flame generated in the interior cavity of said tumbler. The glass is heated to a temperature well below 600 degrees Fahrenheit (the temperature at which the molecular structure of glass begins to change) therefore ensuring that the processed glass retains its original properties. This process is repeated numerous times, ensuring that all of the foreign material is removed, before the cullet passes through the entirety of the chamber and is cooled to be processed into the desired grades.

14 Claims, 11 Drawing Sheets

BROKEN GLASS CLEANING METHOD AND PLANT

This application is a continuation-in-part of U.S. patent application Ser. No. 08/953,119 filed Oct. 17, 1997 now abandoned.

BACKGROUND OF THE INVENTION

The present invention relates to a method of cleaning broken glass. More specifically to a method and plant for removing labels and debris from broken glass and preparing it for processing in a crusher/classifier where it is further crushed and sorted into smaller pieces or grades to be used in a variety of applications.

Typical recycling of glass has in the past, been a labor intensive industry as glass bottles of different colors are often sorted into separate areas prior to melting. When this glass is melted, labels, adhesives and other materials are generally burned away. The melted glass may then be processed and mixed with virgin glass as necessary.

A second type of glass recycling involves crushing glass into small particles. The processing of glass in this manner requires that the glass remain below a temperature of 600 degrees Fahrenheit, as the molecular structure of the glass begins to change above this temperature, rendering the glass unsuitable for crushing.

One of the primary uses for crushed glass is in abrasive blasting, which has replaced sand blasting in many areas. Sand blasting has commonly used silica sand as the abrasive element in the procedure. The use of silica sand has been banned or severely restricted in many areas. This is due to the silica dust contained in silica sand. Silica dust has been found to be one the most dangerous types of dust that a human can breath. Due to the toxicity of silica dust, it has been necessary to replace the sand in blasting with other abrasive media. It has been discovered that finely crushed or powdered glass has excellent qualities when used as an abrasive material. Current uses have included industrial blasting of steel equipment all the way to medical uses including abrasive blasting of dental fixtures such as dentures.

A second use for finely crushed or ground glass is as a filter media for potable public water supplies. Much research is currently being done using crushed glass as a filter media in place of sand which is typically used. Glass has been found to be superior to sand in filtering, and responds more favorably to back washing than sand filters. Still other uses include additives for paint and tiles, while larger pieces may be used for decorative applications such as gravel in fish tanks.

Recycled glass used for crushing has, in the past, been manually sorted, removing the bottles which have paper labels or adhesives. Typically, any glass which does not contain lead is suitable for use in the crushing process, regardless of color. During sorting and recycling many pieces are broken into quarter size pieces and smaller this type of glass, when of a uniform color, is referred to as cullet. If the crushed glass is not sorted as to color the resulting product is referred to as mixed cullet. Mixed cullet containing labels and label adhesives has, in the past, been unsuitable for crushing, as the labels could not easily be removed. Further, this glass is usually unsuitable for melting as it cannot easily be color sorted. Thus, this glass or mixed cullet has ended up as land fill material.

From this discussion it can be seen that it would be desirable to create a plant and method for cleaning dirty cullet containing labels so that it may be used for crushing and thus, recycled instead of ending up as land fill material. Further, it can be seen that it would be desirable to provide such a method that would remove labels and adhesives in a manner that would not change the molecular structure of the glass contained therein The present invention addresses these problems by providing a large tumbling device into which broken pieces of labeled glass such as beverage bottles, or cullet, are fed. The glass is tumbled and passed through a flame which heats the cullet to a temperature well below 600 degrees Fahrenheit (the temperature at which the molecular structure of glass begins to change) but high enough to burn a large percentage of the labels from the glass. The tumbling process is repeated numerous times, ensuring that high percentage of the foreign material is removed, before the cullet passes through the entirety of the chamber and is cooled to be processed into the desired grades. The present invention also offers other advantages over the prior art and solves various problems associated therewith.

SUMMARY OF THE INVENTION

It is the primary objective of the present invention to provide a means by which the vast amount of labeled glass that is discarded today can be reused in an economical and efficient manner without regard for the original color of the glass being processed.

It is an additional objective of the present invention to provide a means of removing labels and other debris from the surface of this discarded glass which most typically consists of the glass bottles used in beverage production.

It is a still further objective of the present invention to provide a means of removing this debris in a manner that does not change the molecular structure of the glass that is being processed.

These objectives are accomplished through the use of a large tumbling device into which broken pieces of labeled glass, or cullet, are fed. After entering the interior chamber of the tumbler, the cullet is carried by a plurality of interior fins along the inside circumference of the tumbler to a point where they fall back to the low point of the tumbler. During this fall, the cullet passes through a flame generated in the interior cavity of said tumbler. The flame heats the cullet to a temperature of approximately 430 degrees Fahrenheit which is well above the flash point of the foreign labeling material on the cullet. Additionally, the temperature inside the chamber is well below 600 degrees Fahrenheit (the temperature at which the molecular structure of glass begins to change) therefore ensuring that the processed glass retains its original properties. This process is repeated numerous times, ensuring that a high percentage of the foreign material is removed, before the cullet passes through the entirety of the chamber and is cooled to be processed into the desired grades.

For a better understanding of the improvements provided by the present invention, reference should be made to the drawings in which there is illustrated and described preferred embodiments of the present invention.

DESCRIPTION OF THE PREFERRED EMBODIMENT

Figure 1:
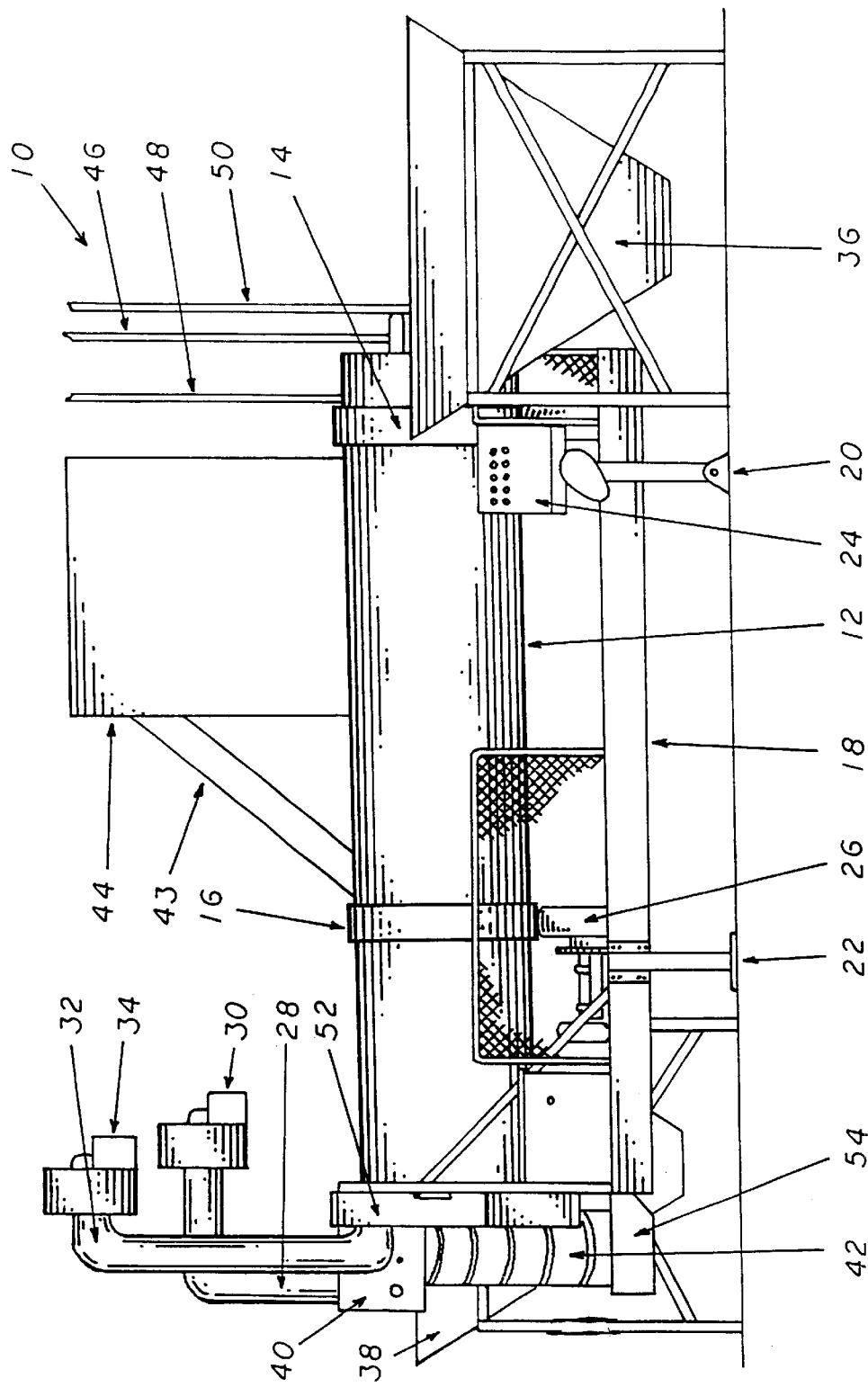
FIG. 1 is a side elevation view of the broken glass cleaning plant showing its major components and the orientation of the other equipment used in conjunction with it during operation.
Figure 2:
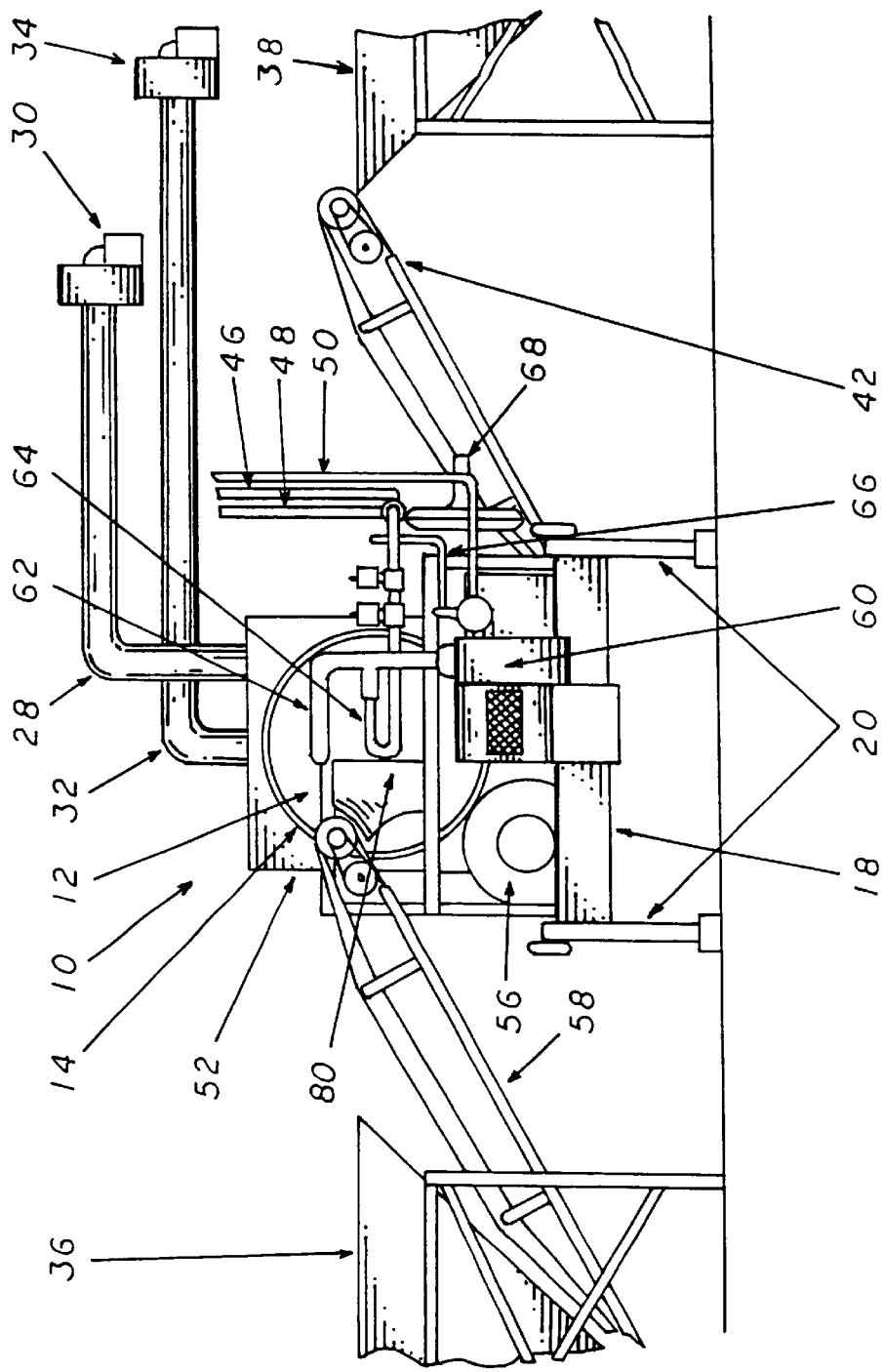
FIG. 2 is a front elevation view of the present invention showing the orientation of its forward major components and their relationship to the material bins and conveyor belts during operation.
Figure 3:
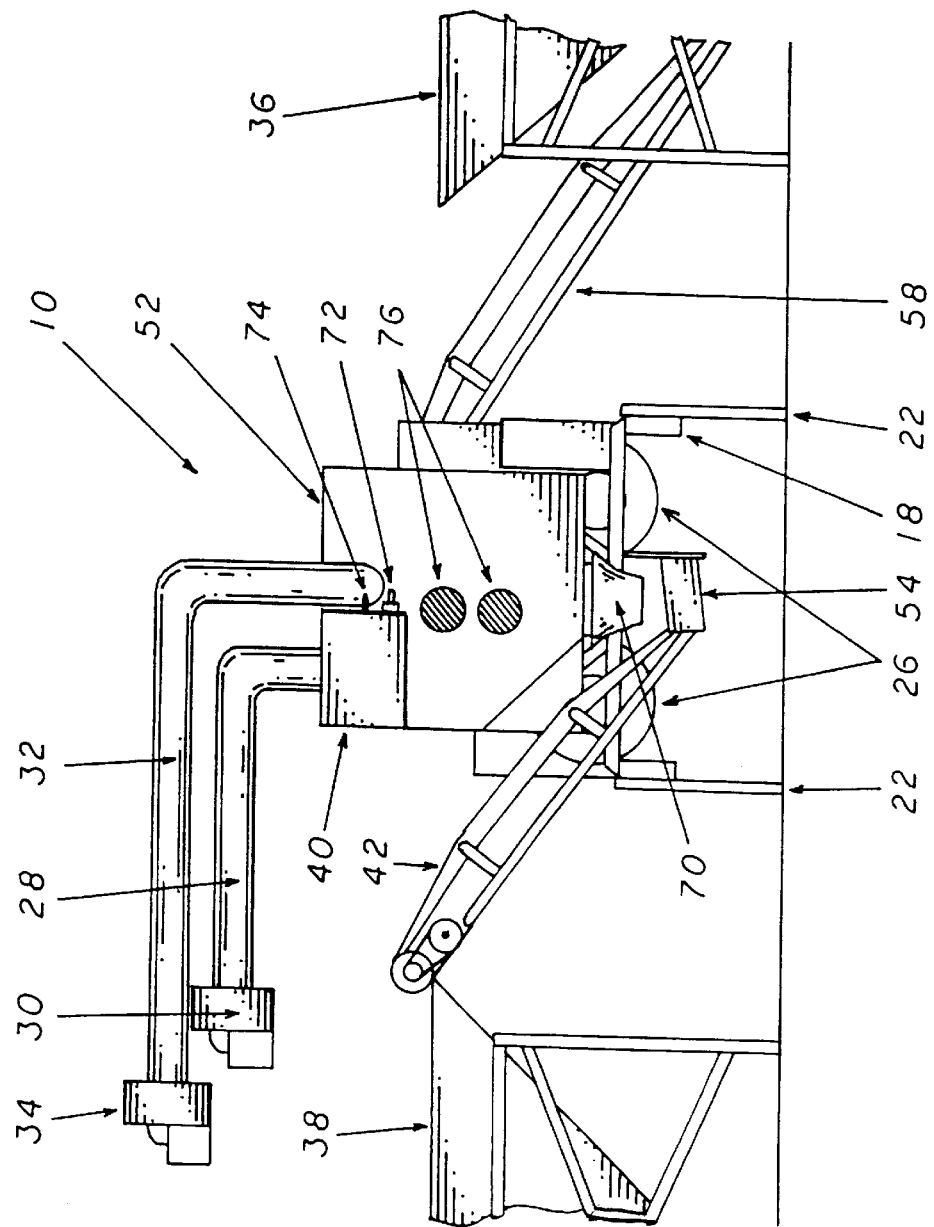
FIG. 3 is a rear elevation view of the present invention showing the orientation of its rearward major components and their relationship to the material bins and conveyor belts during operation.
Figure 4:
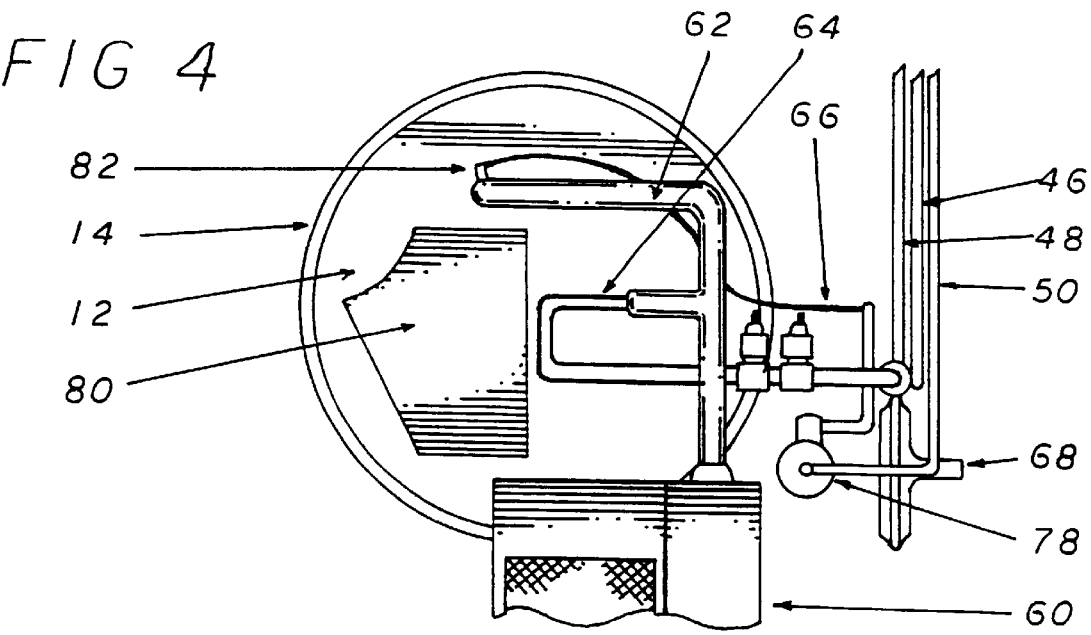
FIG. 4 is a front elevation view of the gas delivery system of the present invention detailing the manner in which gas is supplied to the burner and the method by which it is mixed with air prior to ignition.
Figure 5:
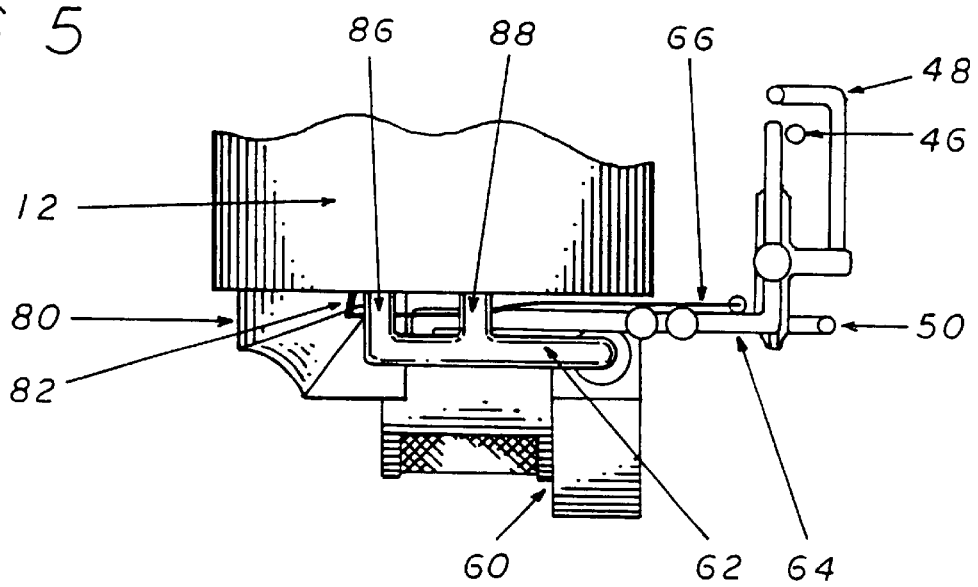
FIG. 5 is a top elevation view of the gas delivery system of the present invention, again detailing the manner in which gas is supplied to the burner, and the method by which it is mixed with air prior to ignition.
Figure 6:
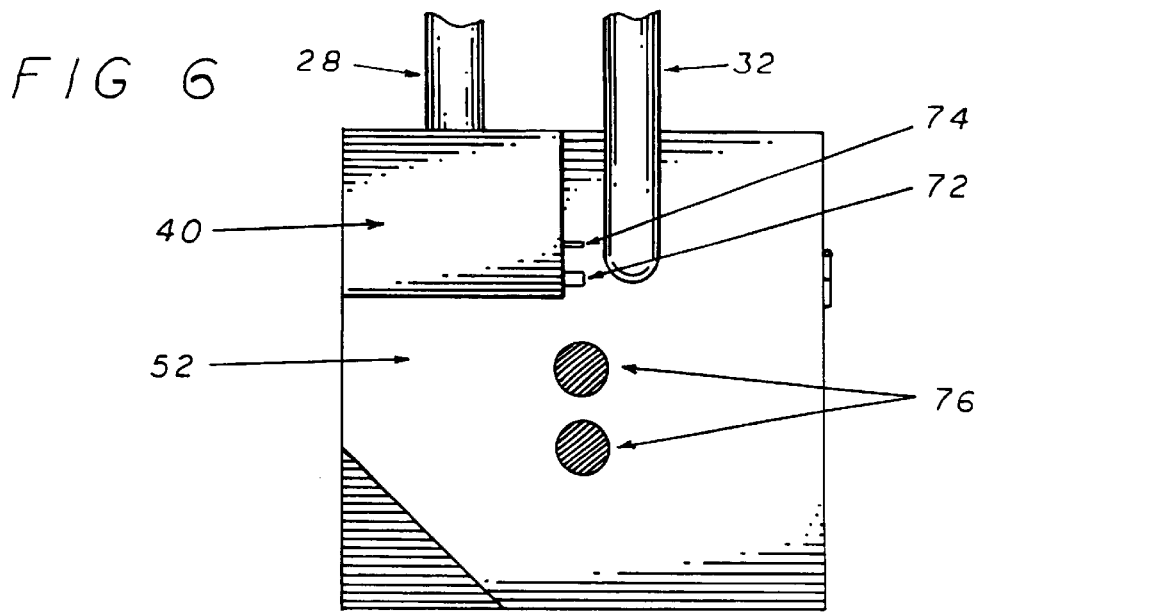
FIG. 6 is a rear elevation view of the present invention showing the manner of construction of the rear glass tumbler cover and the orientation of the external exhaust and cooling air components of said invention.
Figure 7:
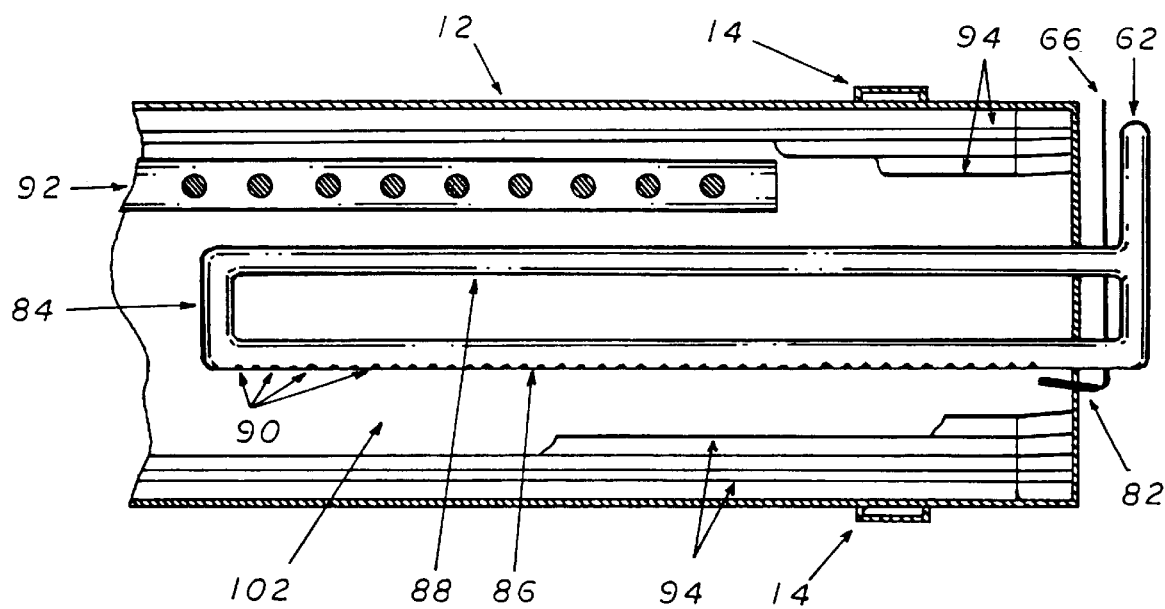
FIG. 7 is a side elevation cut-away view of the combustion chamber of the present invention showing the manner of construction of the burner, the exhaust collection manifold and the glass collection fins located therein.
Figure 8:
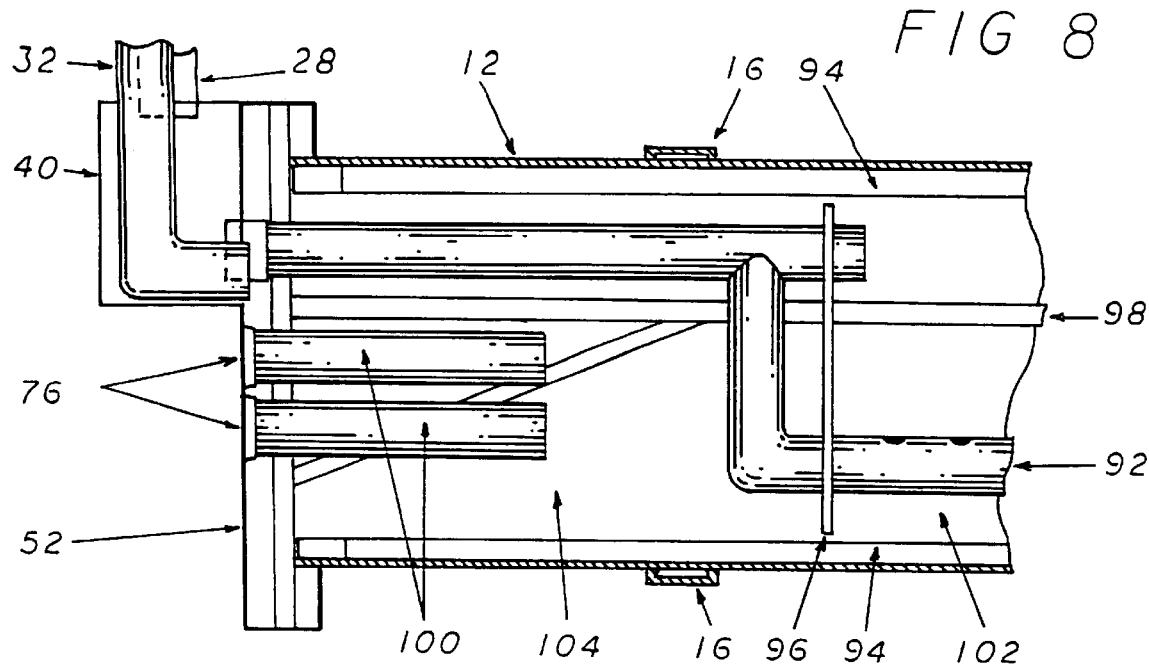
FIG. 8 is a side elevation cut-away view of the cooling chamber of the present invention showing the manner of construction of the exhaust and cooling components of said invention.
Figure 9:
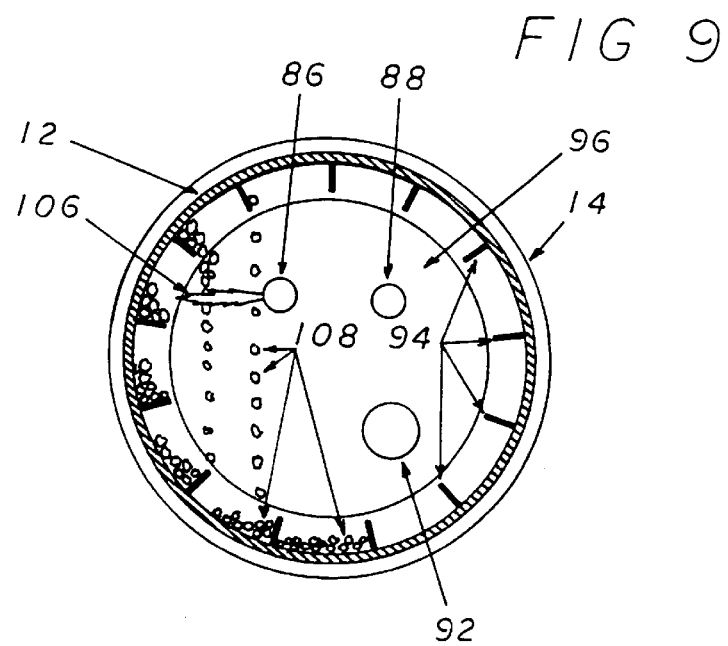
FIG. 9 is a front elevation cut-away view of the combustion chamber of the present invention showing the manner in which glass particles are collected by the internal fins and carried to a point at which they will fall through the gas flame generated by the burner.

Referring now to the drawings, and more specifically to FIGS. 1, 2 and 3, the broken glass cleaning plant 10 is made up of a large tumbler cylinder 12 which is mounted at a slight front to rear downward sloping angle on the tumbler frame 18. The frame 18 is positioned and held in place by the use of the front support legs 20 and the rear support legs 22 which are mounted respectively to the front and rear portions of the frame 18 and are all individually adjustable to allow for the level deployment of the present invention on an uneven surface. This feature facilitates the even flow of glass through the present invention during operation.

The primary mechanism by which the tumbler cylinder is held in place is by the use of the rear drive wheels 26 and the front idler wheels 56 which respectively engage the front idler ring 14 and the rear drive ring 16 which, in turn, each extend slightly outward from and completely encircle the outside circumference of the tumbler cylinder 12. The tumbler cylinder itself is constructed in a manner that allows its outside shell to rotate freely while the inside components remain in a stationary position. Therefore, as rotational force is supplied to the drive wheels 26 it is transferred to the tumbler cylinder 12. Additionally, the drive wheels 26 work in conjunction with the idler wheels 56 to keep the tumbler cylinder 12 in the correct longitudinal position in relation to the other components of the present invention. Thus, the idler wheels 56 and the drive wheels 26 not only support the majority of the weight of the tumbler cylinder 12, but also provide the rotational force and longitudinal stability necessary to facilitate the movement of glass through the present invention.

During operation, the present invention is typically used in conjunction with other equipment such as a raw material bin 36, a clean material bin 38, and a crusher/classifier 44. The raw material bin 36 is positioned towards the front of the tumbler cylinder 12 and provides the storage capacity for the materials to be processed by the present invention. Broken glass is dumped into the open top of the raw material bin 36 and during operation is metered out the bottom onto the raw material conveyor 58. The raw material conveyor 58 then moves the glass to the front of the tumbler cylinder 12 and dumps it into the raw material collector 80 where it then enters the interior of the present invention for processing.

Once the glass cleaning process is completed, the cleaned glass exits the rear of the tumbler cylinder 12 through the clean material chute 70 and drops into the clean material collector 54 where it is picked up by the clean material conveyor 42 and transferred to the open top of the clean material bin 38. From here, the cleaned material is metered out the bottom and onto the crusher/classifier conveyor 43, which transfers it to the crusher/classifier 44 which processes the raw material into the different grades desired. This entire operation is controlled by the control box 24 located on the frame 18 towards the front of the tumbler cylinder 12.

These figures also illustrate the location of the major external components of the present invention. These include the gas feed line 46, which supplies the gas to the gas manifold 62 (and therefore the gas used in the burning process) located on the forward end of the tumbler cylinder 12. Also included in the gas supply system are the main gas vent 48, which provides the OSHA required venting mechanism for the gas system, the pilot gas feed 66, which provides a method for system ignition during plant start up, and the pilot gas vent 50, which vents the pilot system to the outside air.

At the rear of the tumbler cylinder 12 there is located the rear tumbler cover 52, which provides the rear seal for the tumbler cylinder 12. The rear tumbler 52 cover also is the attachment point for the exhaust venting and cooling systems of the present invention. Exhaust produced by the plants combustion process exits through the exhaust trap 40, which serves to trap any larger air borne particles in the exhaust, and into the exhaust stack 28. This exhaust system is powered by the exhaust fan 30, which is located at the furthest point on the exhaust stack 28, and draws the exhaust gases from tumbler cylinder 12.

The rear tumbler cover 52 is vented in its outward surface by the cool air intake ports 76, which allows cool air to enter the rear of the tumbler cylinder 12 and helps to cool the cleaned material before it exits the plant. This process is enhanced by the use of the cooling stack 32 and the cooling fan 34, which are connected to the tumbler cylinder 12 through the rear tumbler cover 52. The cooling fan 34, located at the furthest point on the cooling stack 32, serves to draw cool air into the tumbler cylinder 12 through the cool air intake ports 76.

The gas delivery and burning systems of the present invention are illustrated in FIGS. 2, 4, 5, and 7. Gas for the burning process is supplied from an outside source through the gas feed line 46 and into the gas regulator 68. From this point it travels through the manifold gas feed line 64 to the gas manifold 62. Air is supplied to the manifold 62 by the air blower 60 which is fixed to the most forward end of the frame 18 below the tumbler cylinder 12.

From the gas manifold 62 the gas/air mixture is forced, by the air pressure created by the air blower 60, into the gas burner 84 which extends from the gas manifold 62 into the combustion chamber 102 of the tumbler cylinder 12. The gas burner 84 is made up of the burner pressure side 86 and the burner back-pressure side 88. These two components meet and join at the furthest extent of the burner 84 and thus, in conjunction with the gas manifold 62, form a continuous ring of pressurized gas/air mixture to feed the burner 84. The purpose of this design of the burner 84 is that if a straight burner tube was used, the flame screen 90 furthest from the gas manifold 62 would be supplied with less gas than the portion located closer to the gas manifold 62 and would, therefore, operate less efficiently. This configuration ensures that all of the flame screen 90, of the present invention, is supplied with an equal amount of gas/air mixture and, therefore, operates at an equal level of efficiency.

The gas/air mixture leaving the manifold 62 and entering the burner 84 is ignited by the pilot 82. The pilot is supplied with gas by means of the pilot gas feed 66 which, through the pilot gas regulator 78, takes gas from the manifold gas feed line 64. Both the main gas and pilot gas supply systems are vented to the outside, as required by law, by the use of the main gas vent 48 and pilot gas vent 50.

The manner in which the glass particles 108, or cullet, pass through, and are processed by the present invention, is detailed in FIGS. 6, 7, 8, and 9. After entering the combustion chamber 102 of the tumbler cylinder 12, the glass particles fall to the lowest point of the internal surface of the rotating tumbler cylinder 12. At this point the glass particles are picked up by one of the plurality of glass collection flightings 94 which line and extend inwardly from the interior wall of the tumbler cylinder 12. The glass particles are then carried by these flightings 94 to a point along the interior which corresponds to about 10 O'clock at which point, and continuing to about 11:30, they to fall back to the lowest point of the rotating tumbler cylinder 12. As the glass particles fall, they pass through the burner flame 106 that extends from the burner 84 towards the nearer portion of the rotating tumbler cylinder 12. The movement of the glass particles 108 is facilitated by the glass collection flighting 94 and the general front to back slope of the tumbler cylinder 12. Therefore, the glass particles 108, or cullet, repeatedly go through this process as they pass down the length of the combustion chamber 102.

By the afore described process, the glass particles 108 in the combustion chamber 102 are heated to a temperature of between 410 and 450 degrees Fahrenheit. This temperature is sufficient to remove a vast majority of the paper and other substances used in labeling bottles. It is also important that this temperature is well below the temperature at which the molecular structure of the glass begins to alter, or about 600 degrees Fahrenheit. Therefore, the finished product obtained by this process retains all of the desirable properties of the raw material glass.

The tumbler cylinder 12 is internally divided by the chamber divider plate 96 which serves to separate the combustion chamber 102, at the front end of the cylinder from the cooling chamber 104, located at the rear. The chamber divider plate 96 is held in place by the divider plate support 98 which extends down the length of, and is attached to either end of, the tumbler cylinder 12. This configuration allows for the separation of the internal area of the tumbler cylinder 12, which provides for the partial cooling of the cleaner glass particles 108, before they leave the present invention.

As the glass particles pass underneath the chamber divider plate 96, and into the cooling chamber 104, the falling action facilitated by the glass collection flighting 94 continues. This provides the maximum cooling of the glass particles 108, as each has a high degree off contact with the unheated air of the cooling chamber 104. This is optimized by the continuous introduction of outside air into the cooling chamber 104 by the use of the cool air stacks 100, the cooling air stack 32, and cooling air fan 34. The outside air enters the cooling chamber 104 through the rear tumbler cover 52, and the cool air intake ports 76, and are introduced well inside of the cooling chamber 104 by the use of the cool air stacks 100. Air movement in this system is provided by the cooling fan 34 which is located at the far end of the cooling stack 32 and connected to the upper end of the cooling chamber 104. This process cools the glass particles before leaving the tumbler cylinder 12.

The exhaust gases produced in the combustion chamber 102 are collected by the exhaust collection manifold 92, which is a vented pipe extending from the exhaust stack 28, into the combustion chamber 104. The negative pressure necessary in moving the exhaust from the collection manifold 92 to the exhaust stack 28, is provided by the exhaust fan 30 located at the far end of the exhaust stack 28. As the exhaust passes from the collection manifold 92 to the exhaust stack 28, it passes through the exhaust trap 40 where larger particles contained in the exhaust gases are trapped. It is at this point that the temperature and the pressure of the produced exhaust gases are monitored by the use of the exhaust pressure sensor 72 and the exhaust temperature sensor 74.

Figure 10:
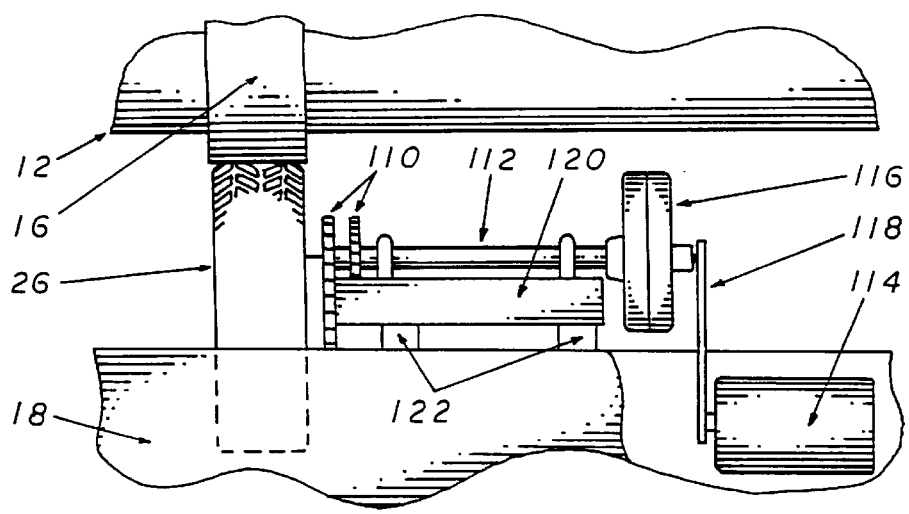
FIG. 10 is a side elevation of the drive system of the present invention detailing the manner in which the drive tire engages the drive ring on the tumbler cylinder and the manner by which said tire is driven by the electric motor.
Figure 11:
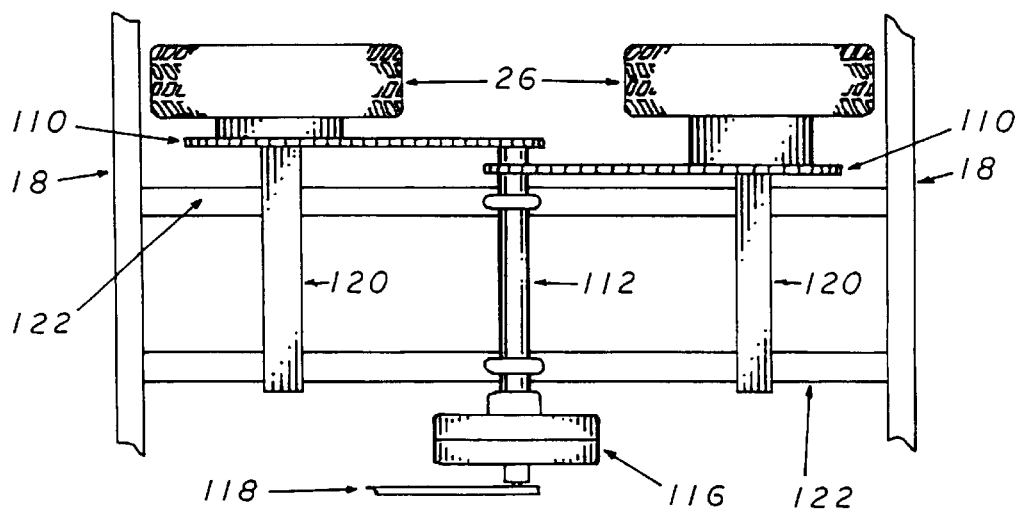
FIG. 11 is a top elevation view of the drive system of the present invention showing how it is attached to the frame of said invention and detailing the manner in which the two drive tires are driven by a single drive axle.

The drive system that provides the rotational force necessary to rotate the tumbler cylinder is illustrated in FIGS. 10 and 11. The drive wheels 26 engage the drive ring 16 that entirely encircles the outside circumference of the tumbler cylinder 12. The rotational force is supplied to the drive tires 26 by the electric motor 114, which is mounted on the inside wall of the frame 18. The electric motor 114 supplies rotational power to the drive gear box 116 through the drive belt 118. The gear box 116 then rotates the drive axle 112 which in turn drives the wheel drive chains 110 and, therefore, the drive wheels 26. The drive axle 112 is held in place by being attached at its front and rear ends to the two drive system cross-members 122, which perpendicularly span the distance between the two parallel members of the frame 18.

Perpendicularly attached across the drive system cross-members 122 are the drive wheel supports 120, which provide the attachment points for the drive wheels 26. In addition to the rotational force that this configuration provides, it also supplies most of the support to the tumbler cylinder 12 by bearing the weight of said cylinder between the two drive wheels 26 used.

An alternative embodiment of the present invention is illustrated in FIGS. 12, 13, 14, 15, 16, and 17. The purpose of this embodiment of the invention is to provide a means by which the glass particles 108 leaving the combustion chamber 102 can be more effectively cooled before exiting the invention than in the previous embodiment. This is accomplished by the use of a stepped tumbler cylinder 124 which has a cooling chamber 104 that is significantly larger in diameter than the combustion chamber 102. The primary benefit of this larger cooling chamber 104 is that it allows for the introduction of larger amounts of cool outside air into the chamber 104 where it contacts and cools the glass particles 108 and further moves a greater rotational distance.

Figure 12:
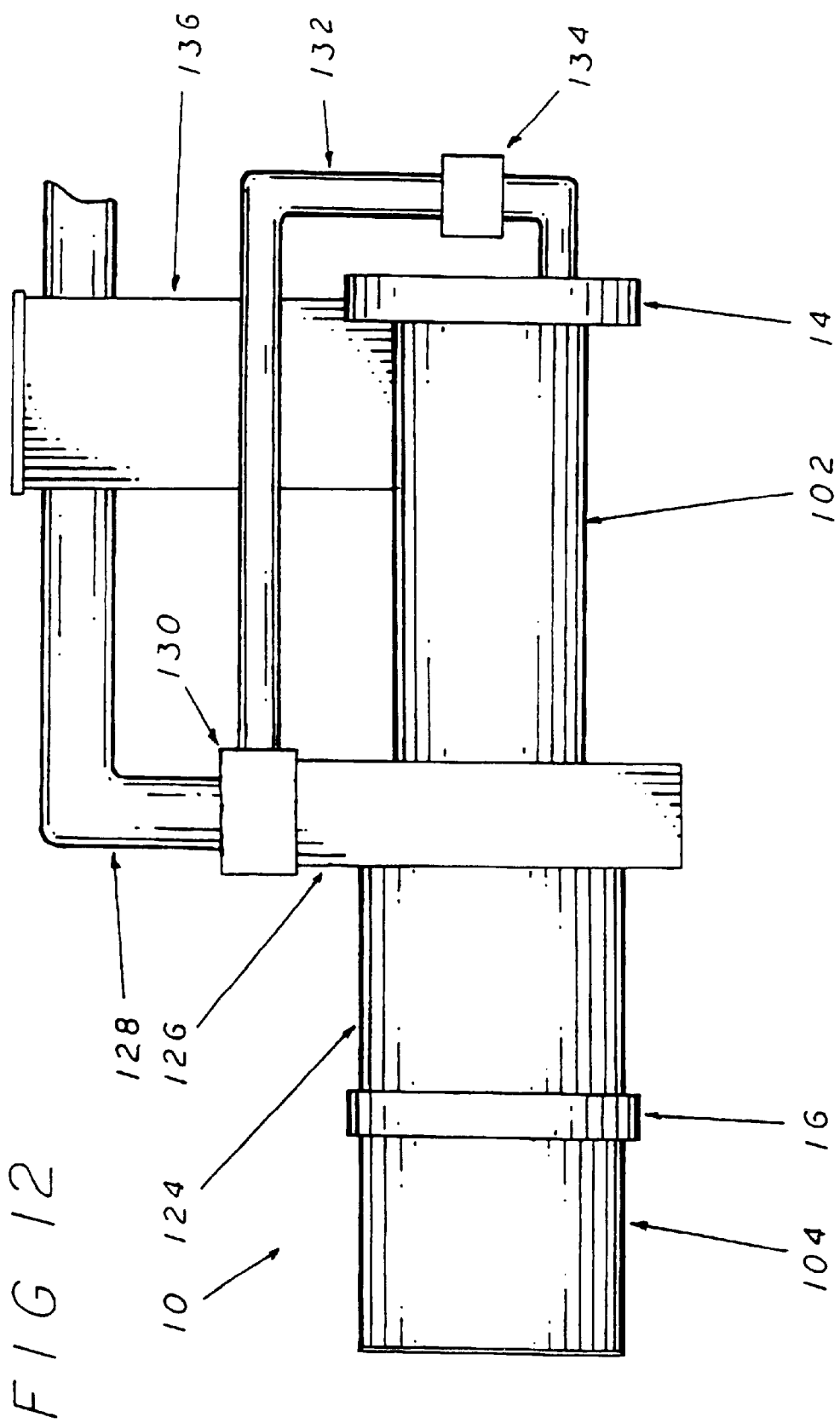
FIG. 12 is a side elevation view of an alternative embodiment of the present invention which employs a stepped tumbling chamber and an improved method of cooling the product prior to its exit from the chamber.

The general exterior manner of construction of the stepped cooling chamber 104 and the orientation of the air intake and exhaust components are illustrated in FIG. 12. This Figure clearly shows the step between the combustion and cooling chambers, 103 and 104, and also illustrates that this embodiment of the invention still employs the front and rear idler rings, 14 and 16, that are used in the previous embodiment to rotate the tumbler cylinder 124 during operation. The remaining components illustrated in this Figure depict additional components that, for the purposes of this discussion, are specific to this later embodiment but it must be made clear that any of these components could also be used with the previous or any other embodiment of the present invention.

The stepped tumbler cylinder 124 illustrated in FIG. 12 also has an additional air exhaust system that is designed to work with the larger cooling chamber 104 to lower the temperature of the glass particles 108 leaving the invention. The primary component of this exhaust system is the exhaust manifold 126 which fits around and encloses the portion of the stepped tumbler 124 at the point at which the combustion and cooling chambers, 102 and 104, are joined together. This forms a chamber at this point which is connected through an air damper 130 and the cool air exhaust stack 128 to the bag house 136. The bag house 136 is equipped with a powerful fan which serves to draw fresh air from the cooling chamber 104, through the cool air exhaust stack 128, and into the interior of the bag house 136 where impurities are removed prior to the release of the air. The flow of this air through these systems is controlled by the stack damper 130 located just above the exhaust manifold.

This system is also connected just above the exhaust stack damper 130 to the hot air exhaust stack 132 which serves to remove the heated air generated within the combustion chamber 102 during the operation of the invention. The flow of air in the hot air exhaust stack is generated by the fan in the bag house 136 through the connection above the exhaust stack damper 130 and is itself controlled by the use of the hot air damper 134. These connected air exhaust systems allow for the removal and cleansing of all the air used by the present invention through one device which increases the overall operating efficiency of all the invention's components.

Figure 13:
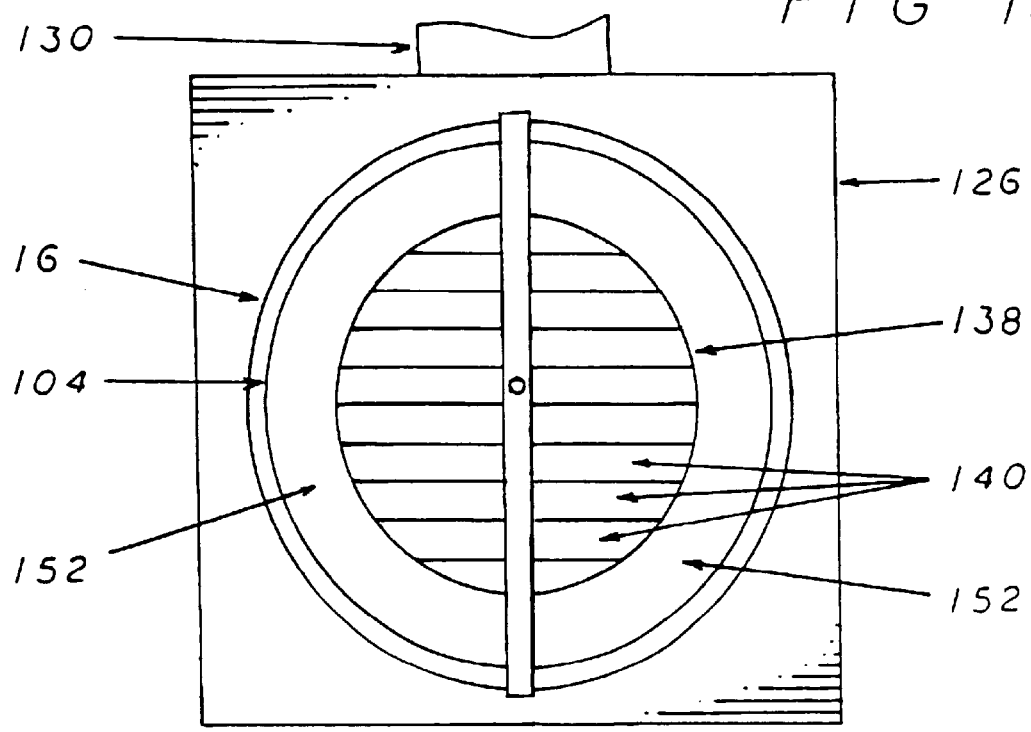
FIG. 13 is a side elevation of the cooling chamber component of the alternative embodiment of the present invention detailing the manner of construction of the cool air intake portion of the invention.
Figure 14:
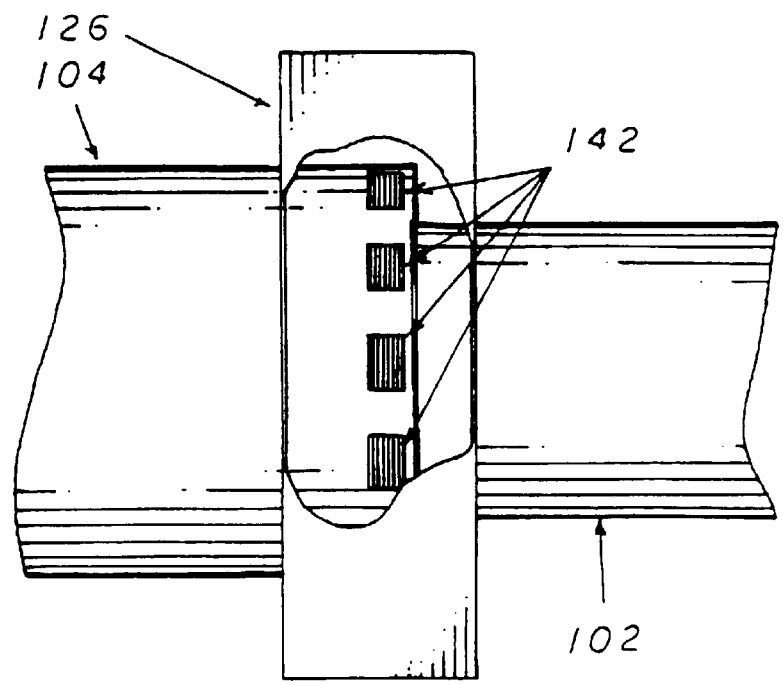
FIG. 14 is a side elevation cut-away view of the alternative embodiment of the present invention detailing the internal construction of the exhaust manifold.

The manner in which the cooling air is introduced to the cooling chamber 104 and the manner in which it passes from the interior of the chamber 104 to the interior of the exhaust manifold are illustrated in FIGS. 13 and 14. The flow of air into the cooling chamber 104 is controlled by the cooling chamber air intake 138 which is essentially a cap that seals off the end of the cooling chamber 104 that is opposite the exhaust manifold 126. The cooling chamber air intake 138 is made up of two cooling chamber doors 152 which can be opened outwards from the center to allow access to the interior of the cooling chamber for cleaning and other maintenance. The cooling chamber air intake 138 is also equipped with a plurality of air louvers 140 which are a series of longitudinal flaps that can be opened or closed to control the flow of air depending on the needs of the cooling chamber 104.

The flow of air through the cooling chamber 104 and into the exhaust manifold 126 is also facilitated by the use of the air exhaust slots 142 which are located in the surface of the cooling chamber 104 within the portion that is enclosed by the exhaust manifold 126. The air exhaust slots 142 are a plurality of holes that are cut into the exterior shell of the cooling chamber 104 and which allow for the passage of air from the interior of the chamber 104 to the exhaust manifold 126. This design allows the fan that is contained within the bag house 136 to draw cool air into the cooling chamber 102 through the air louvers 140 and then into the exhaust manifold 126 and bag house 136 through the air exhaust slots 140. This ensures that an adequate amount of cool air is always available to cool the glass particles 108 that are passing through the invention.

Figure 15:
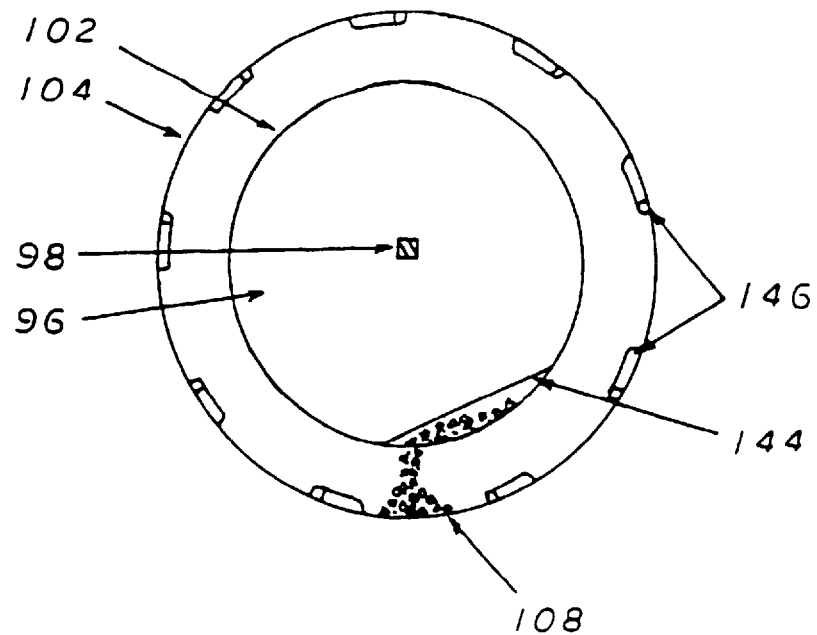
FIG. 15 is a side elevation internal view of the alternative embodiment of the present invention detailing the manner of construction and operation of the chamber divider plate.
Figure 16:
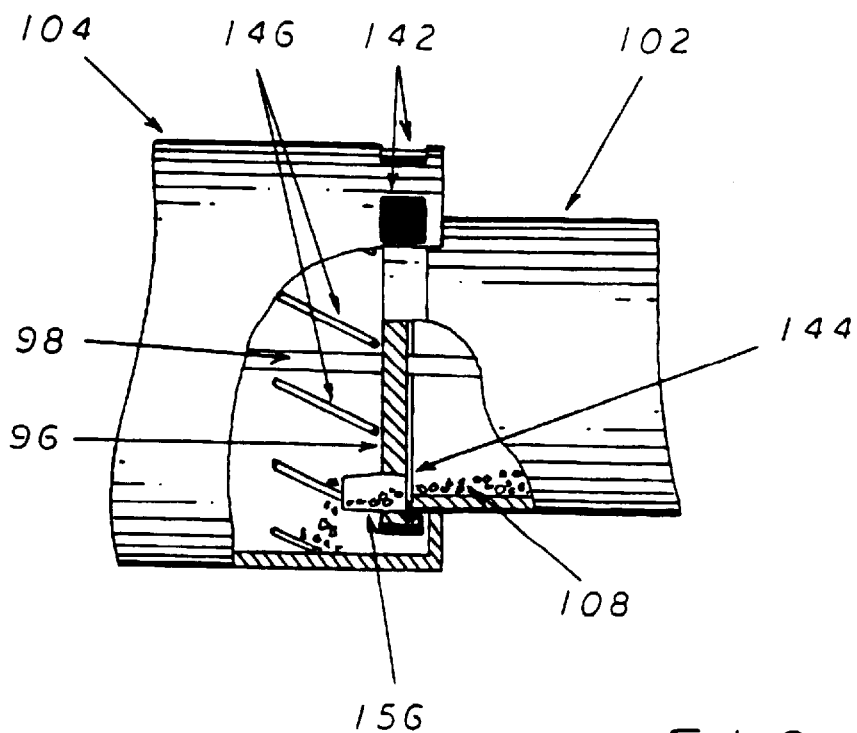
FIG. 16 is a side elevation cut-away view of the alternative embodiment of the present invention detailing the internal construction of the connection between the combustion and cooling chambers.
Figure 17:
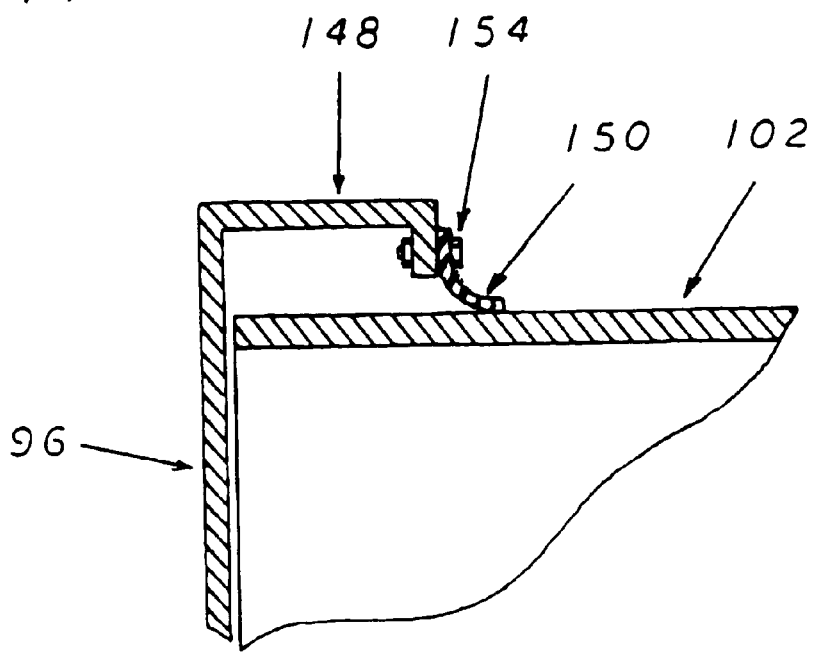
FIG. 17 is a sectional side elevation view of the connection point between the combustion chamber and the divider plate of the alternative embodiment of the present invention illustrating the manner in which a seal is obtained in the is connection.

This embodiment of the present invention is also equipped with a specially designed chamber divider plate 96 which is further illustrated in FIGS. 15 and 16 and that effectively separates the combustion chamber 102 from the cooling chamber 104. As in the previous embodiment of the invention, the divider plate 96 is held in place by the use of the divider plate support bar 98 which extends for the length of the tumbler cylinder 124. However, the divider plate 96 in this embodiment is only open between the chambers in one small diagonally cut area called the divider plate dispersion slot 144 which is located at its lower most edge. This design allows the glass particles 108 to pass from the combustion chamber 102 to the cooling chamber 104 through this small opening while limiting the amount of heated air that gets into the cooling chamber 104. This limited transfer of heat to the cooling chamber 104 occurs because of the relatively small size of the divider plate dispersion slot 144 and its location on the lowest possible area as the heat tends to rise within the combustion chamber 102.

These Figures also illustrate the manner in which the glass particles 108 pass from the combustion chamber 102 to the cooling chamber 104. At the portion of the combustion chamber 102 that is at the center of the tumbler cylinder 124 the glass particles 108 fall to the lowest part of the interior of the combustion chamber 102. From this point, the glass particles 108 are forced through the dispersion slot 144 and the dispersion spout 154 at the bottom of the divider plate 96 and they fall onto the lowest part of the interior of the cooling chamber 104 at a point beyond the location of the air exhaust slots 142 where they are picked up by the movement initiators 146 which begins their transference to the rear of the cooling chamber 104 where they exit the invention in a cooled state.

Finally, the divider plate 96 of this embodiment of the present invention is also equipped with a mechanism which allows the combustion chamber 102 to be sealed off from the cooling chamber 104. This design feature is detailed in FIG. 17 and is accomplished by the design of the outer edge of the divider plate 96. The outer edge of the divider plate 96 is manufactured in a U-shaped lip 148 that extends over the outside edge of the combustion chamber 102. This divider plate lip 148 at its most rearward edge extends slightly down towards the outer surface of the combustion chamber 102. At this point, there is attached a high temperature rubber seal 150 (this attachment being made by a seal bolt 154 which passes through the seal 150 and the divider plate lip 148) which extends down to the point at which it contacts the surface of the combustion chamber 102. This not only creates a seal between the combustion chamber and the cooling chamber 104, but also creates a seal between the interior of the tumbler cylinder 124 and the outside air. This ensures that the exhaust forces supplied to the interior of the tumbler cylinder 124 by the bag house 136 work effectively and enhance the operation of the invention.

Although the present invention has been described in considerable detail with reference to certain preferred versions thereof, other versions are possible. Therefore, the spirit and scope of the appended claims should not be limited to the description of the preferred versions contained herein.

What is claimed is:

1. A broken glass or cullet cleaning plant used to burn labels and debris from broken glass prior to reusing said glass, said plant comprising:
   a tumbler frame with a front and rear support system;
   a cylindrical tumbler having an outer surface and an inner surface, placed so as to be adjustable at an angle off of the horizontal on said tumbler frame, said cylindrical tumbler further having a high front side and a lower rear side,
   a means of suppling a stream of glass containing labels to be burned to the high side of said tumbler;
   a means of moving the glass within said tumbler;
   an elongate burner section in said cylindrical tumbler, said burner section defining a plurality of openings along the length of said burner section;
   a drive system for rotating said tumbler about said burner so that the stream of glass is carried partially around said cylinder before dropping through the flame produced by said burner;
   a cooling chamber on the low side of said tumbler containing an air cooling system; and
   a divider means between said cooling chamber and said burner section.

2. A broken glass cleaning plant as in claim 1 wherein said cooling chamber further comprises a cool air intake port and an exhaust system.

3. A broken glass cleaning plant as in claim 2 wherein said means of moving glass within said tumbler is a plurality of glass collection flights protruding from the inner surface of said tumbler.

4. A broken glass cleaning plant as in claim 3 wherein said burner further comprises an elongate burner back pressure portion.

5. A broken glass cleaning plant as in claim 4 wherein said means of suppling a stream of glass comprises a raw material bin attached to a conveyor system for moving glass.

6. A broken glass cleaning plant used to burn labels and adhesives from broken glass prior to reusing said plant comprising:
   a tumbler frame with a front and rear support system;
   a cylindrical tumbler having an outer surface and an inner surface, placed so as to be adjustable at an angle off of the horizontal on said tumbler frame, said cylindrical tumbler further having a high front side and a lower rear side,
   a plurality of glass collection flights protruding from the inner surface of said tumbler and extending longitudinally the length of said tumbler;
   an elongate burner section in said cylindrical tumbler orientated so as to be substantially parallel with said cylindrical tumbler;
   a rotating apparatus to turn said tumbler about said burner so that the stream of glass is carried partially around said cylinder before dropping through the flame produced by said burner and repeating the action;
   a divider section in said cylindrical tumbler perpendicularly dividing said tumbler into two chambers;
   a heating chamber on the front side of said tumbler containing said burner section; and
   a cooling chamber on the rear side of said tumbler containing an air cooling system.

7. A broken glass cleaning plant as in claim 6 wherein said rotating apparatus is a rubber tire drive system.

8. A broken glass cleaning plant as in claim 7 further comprising a conveyor system for moving glass into said heating chamber.

9. A broken glass cleaning plant as in claim 8 further comprising a conveyor system for moving glass out of said cooling chamber.

10. A broken glass cleaning plant as in claim 9 wherein said air cooling system comprise a cool air intake port and an exhaust system operated by a power driven fan.

11. A broken glass cleaning plant used to burn labels and adhesives from broken glass prior to reusing said plant comprising:
    a tumbler frame with a front and rear support system;
    a cylindrical tumbler having an outer surface and an inner surface, placed so as to be adjustable at an angle off of the horizontal on said tumbler frame, said cylindrical tumbler further having a high front side and a lower rear side,
    a means of suppling a stream of glass containing labels to be burned to the high side of said tumbler;
    a plurality of glass collection flights protruding from the inner surface of said tumbler and extending longitudinally the length of said tumbler;
    an elongate burner section in said cylindrical tumbler orientated so as to be parallel with said burner section, said burner section defining a plurality of openings along the length of said burner section for the release of gas perpendicular to said burner section and to said cylindrical tumbler;
    an elongate exhaust collection manifold in said cylindrical tumbler and positioned so as to run parallel to said tumbler, said exhaust collection manifold defining a series of exhaust escape holes;
    a means of rotating said tumbler about said burner so that the stream of glass is carried partially around said cylinder before dropping through the flame produced by said burner and repeating the action; and
    a means of carrying a stream of heated, dry and clean glass away from said low side of said tumbler.

12. A broken glass cleaning plant as in claim 11 further comprising:
- a divider plate in said cylindrical tumbler perpendicularly dividing said tumbler into two chambers;
- a first combustion chamber on the front side of said tumbler containing said burner section; and
- a second cooling chamber on the rear side of said tumbler containing an air cooling system.

13. A broken glass cleaning plant as in claim 12 wherein said means of rotating said tumbler is a rubber tire drive system.

14. A broken glass cleaning plant as in claim 13 wherein said air cooling system comprise a cool air intake port and an exhaust system operated by a power driven fan.

* * * * *